United States Patent [19]
Bernard

[11] Patent Number: 5,094,151
[45] Date of Patent: Mar. 10, 1992

[54] VENTILATOR FOR INSTALLATION IN A VEHICLE WINDOW

[76] Inventor: Ronald V. Bernard, P.O. Box 2588, Florence, Oreg. 97439

[21] Appl. No.: 702,333

[22] Filed: May 20, 1991

[51] Int. Cl.⁵ .............................................. B60H 1/24
[52] U.S. Cl. ................................ 454/131; 160/368.1; 160/DIG. 2; 454/142
[58] Field of Search ...................... 98/2.02, 2.12, 2.13, 98/900; 160/127, 354, 368.1, 369, DIG. 2; 296/152

[56] References Cited

U.S. PATENT DOCUMENTS

| | | | |
|---|---|---|---|
| 1,810,044 | 6/1931 | Harris, Jr. | 98/2.02 |
| 2,680,646 | 6/1954 | Bush | 98/2.13 X |
| 3,166,116 | 1/1965 | Cole, Jr. | 160/369 X |
| 4,864,920 | 9/1989 | Inagaki | 98/2.13 |
| 5,044,258 | 9/1991 | Wu et al. | 98/2.13 X |

FOREIGN PATENT DOCUMENTS 2491009  4/1982  France ................................ 296/152

Primary Examiner—Harold Joyce
Attorney, Agent, or Firm—James D. Givnan, Jr.

[57] ABSTRACT

A ventilator is installed in a partially open window of a vehicle. An expanse of permeable material such as rigid wire cloth occupies the open portion of the window and is equipped with brackets for engagement with the window upper edge. A lower portion of the permeable material overlies the automobile window to provide secure engagement with the window to prevent unauthorized removal or displacement. A margin of the permeable material is provided with non-metallic material which seats within a window channel of the vehicle. Handles in place on the ventilator interior facilitate installation and removal from the vehicle. A fan assembly in place on the interior of the ventilator may be powered by vehicle electrical system or by a solar pad in place within the vehicle.

6 Claims, 1 Drawing Sheet

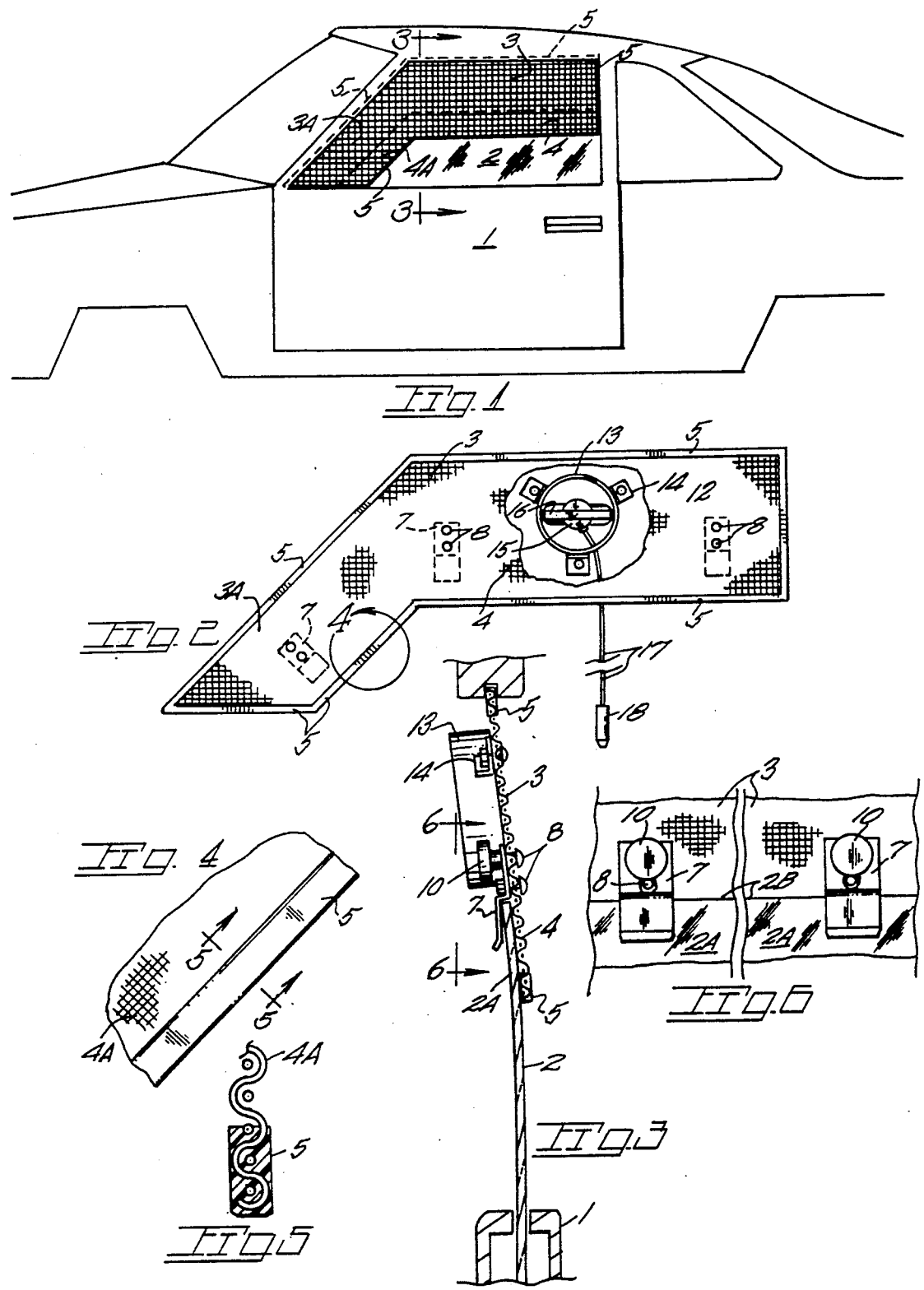

VENTILATOR FOR INSTALLATION IN A VEHICLE WINDOW

BACKGROUND OF THE INVENTION

The present invention pertains generally to screens for placement in an auto window for ventilating the interior of same when parked.

Automobiles exposed to the sun are subject to temperature increases within the automobile interior to the extent that seat, steering wheel and control surfaces become hot to the touch. Further, over a period of time, damage results to interior surfaces of the automobile from excessive temperatures. While efforts to ventilate automobile interiors have included expanses of screening material temporarily installed in a window opening, such efforts are not presently suitable particularly for vehicles parked in unsupervised areas. Automobile window screens having channels on screen edges for installation on the upper edge of an auto window are found in U.S. Pat. Nos. 1,619,501; 1,712,341 and 2,491,574. Such arrangements are of fragile construction and hense susceptible to easy removal by a car thief. Additionally, known vehicle window screens are of such construction to render the cost of manufacture prohibitive. An additional shortcoming of known vehicle window screens is the effort required for installation and removal of same by the vehicle owner.

SUMMARY OF THE PRESENT INVENTION

The present invention is embodied within a ventilator providing air passage through an area provided by a partially opened window to permit ventilation of a parked vehicle without jeopardizing the security of the vehicle.

The subject ventilator includes an expanse of material, such as wire cloth or sheet metal with louvers, shaped about its perimeter for installation in window channels of the vehicle and with a lower portion for overlying surfacial engagement with the outer surface of the vehicle window. Brackets in place on the ventilator interior engage the upper edge of the vehicle window and prevent unauthorized vehicle entry by forceable separation of the ventilator and window. A perimeter of the ventilator is of non-metallic material which prevents marring of vehicle surfaces during ventilator installation and removal. Further, the ventilator perimeter permits snug engagement with the window channels of the vehicle. The rigidity of the expanse of ventilator material permits the optional installation of a fan assembly powered by the vehicle battery or a solar cell.

Important objectives of the present ventilator include the provision of a vehicle ventilator for installation in the open area of a vehicle window and which is of rigid construction for secure engagement with the vehicle and with a partially opened window; the provision of a vehicle ventilator having brackets means on its interior for snug engagement with a window edge to prevent forced entry into the vehicle by separation of the ventilator from the window; the provision of a vehicle ventilator suitable for the support of a fan assembly providing a flow of air through the parked vehicle.

BRIEF DESCRIPTION OF THE DRAWINGS

In the accompanying drawings:

FIG. 1 is an elevational view of the present ventilator in place within the partially open window area of an automobile;

FIG. 2 is an elevational view of the ventilator removed from the auto;

FIG. 3 is a vertical sectional view taken along line 3—3 of FIG. 1;

FIG. 4 is an enlarged fragmentary elevational view of that portion of the ventilator encircled at 4 in FIG. 2;

FIG. 5 is a vertical sectional view taken along line 5—5 of FIG. 4, and

FIG. 6 is an elevational view of a fragment of the ventilator taken along line 6—6 of FIG. 3.

DETAILED DESCRIPTION OF THE PREFERRED EMBODIMENTS

With continuing attention to the drawings wherein applied reference numerals indicate parts similarly hereinafter identified, the reference numeral 1 indicates a vehicle door having a window 2 installed therein.

The present ventilator includes an expanse of permeable material 3 which may, depending upon vehicle window configuration, include a downwardly inclined portion 3A and which occupies an open area resulting from the partial opening of the vehicle window 2. A lower marginal area 4 of the permeable material is adapted to overlie an upper portion 2A of the window for an upright distance of several inches. In those automobile windows having a canted forward edge to define an irregular shaped window opening, permeable material overlapping the window will have an inclined segment at 4A. The perimeter of permeable meaterial 3 includes or carries a nonmetallic edge 5 which may be formed by the application of a synthetic plastic material. Such as edge serves to prevent marring of the automobile surfaces during screen installation and removal as well as provide resilient engagement with channels provided in the vehicle door structure. The cross section of the edge, as shown in FIG. 5, is of a size permitting seating of the edge within window channels in the door.

For retention of the ventilator in place brackets 7, in place on the interior of the ventilator, are of Z-shape to receive the uppermost edge 2B of window 2. Bracket mounting may be made tamper-proof by use of carriage bolts 8.

To facilitate positioning of the ventilator a pair of handles at 10 are mounted in place on the brackets.

A fan assembly is indicated generally at 12 and includes a shroud 13 equipped with angular tabs 14 each receiving a fastener which also extends through the ventilator material 3. A fan motor 15 is suitably mounted to the shroud by a support 16. A power source for a fan motor 15 is provided by an electrical conduit 17 which terminates in a plug 18 of the type insertable within the cigarette lighter socket of a vehicle. Alternatively the fan assembly may be of the solar powered type in which instance the plug 18 would be modified to cooperate with a receptacle provided in a solar cell.

In use, the automobile window is lowered to the extent the ventilator brackets 7 may be brought into rested engagement with window upper edge 2B. Subsequently, the window is raised slightly so as to seat the upper perimeter of the permeable material 3 with the window channel normally receiving the window upper edge. With the expanse of permeable material having its uppermost edge seated in the window channel of the vehicle door and with a lower margin of the permeable material overlying the external surface of the window, the ventilator is locked in place against unintentional displacement in any direction.

A suitable permeable material for the ventilator is woven wire cloth which is of a semi-rigid nature. Such material is highly resistant to bending and accordingly serves to prevent removal from outside the window by the application of force. In some instances sheet metal may be preferred for the permeable material of the ventilator in which instance the sheet metal is formed with a multitude of small louvers.

While I have shown but a few embodiments of the invention, it will be apparent to those skilled in the art that the invention may be embodied still otherwise without departing from the spirit and scope of the invention.

I claim:

1. A ventilator for installation in a window of a vehicle, said ventilator comprising, an expanse of permeable material for installation in a car window between the upper extremity of a partially lowered window and vehicle structure defining the window opening, a lower marginal area of said permeable material adapted to overlie an upper marginal portion of the window, brackets on the permeable material for rested engagement with an upper edge of the window, and said permeable material including a member in place on the perimeter of the material, said member for installation into window channels defined by vehicle structure.

2. The ventilator claimed in claim 1 wherein said brackets are offset upwardly from said lower marginal area of the permeable member.

3. The ventilator claimed in claim 1 wherein said brackets each include a handle.

4. The ventilator claimed in claim 1 wherein said member is embedded in the permeable material.

5. The ventilator claimed in claim 1 additionally including an electric fan assembly in place on said expanse of permeable material.

6. The ventilator claimed in claim 1 wherein said expanse of permeable material is of irregular shape having a forwardly directed inclined portion when in place in the vehicle window.

* * * * *